United States Patent
Jeong et al.

(10) Patent No.: US 12,401,617 B2
(45) Date of Patent: Aug. 26, 2025

(54) APPARATUS AND METHOD FOR PROVIDING BASIC SUPPORT FOR IPV6 NETWORKS OPERATING OVER 5G VEHICLE-TO-EVERYTHING COMMUNICATIONS

(71) Applicant: Research & Business Foundation SUNGKYUNKWAN UNIVERSITY, Suwon-si (KR)

(72) Inventors: Jaehoon Jeong, Busan (KR); Bien Aime Mugabarigira, Suwon-si (KR); Yiwen Shen, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 18/383,102

(22) Filed: Oct. 24, 2023

(65) Prior Publication Data
US 2024/0259342 A1    Aug. 1, 2024

(30) Foreign Application Priority Data
Oct. 24, 2022   (KR) .......... 10-2022-0137822

(51) Int. Cl.
| | |
|---|---|
| *H04L 61/5007* | (2022.01) |
| *H04W 4/46* | (2018.01) |
| *H04W 8/26* | (2009.01) |
| *H04L 101/659* | (2022.01) |

(52) U.S. Cl.
CPC .......... *H04L 61/5007* (2022.05); *H04W 4/46* (2018.02); *H04W 8/26* (2013.01); *H04L 2101/659* (2022.05)

(58) Field of Classification Search
CPC ........ H04L 61/5007; H04W 4/46; H04W 8/26
See application file for complete search history.

(56) References Cited

U.S. PATENT DOCUMENTS

| | | | |
|---|---|---|---|
| 2006/0080728 A1* | 4/2006 | Wen | H04L 69/16 726/4 |
| 2013/0028133 A1* | 1/2013 | Narasimhan | H04L 69/22 370/254 |
| 2021/0014661 A1* | 1/2021 | Jeong | H04W 4/40 |
| 2022/0007445 A1* | 1/2022 | Pan | H04W 40/22 |
| 2022/0095398 A1* | 3/2022 | Pan | H04W 76/14 |

FOREIGN PATENT DOCUMENTS

| | | | | |
|---|---|---|---|---|
| EP | 3678450 A1 * | 7/2020 | ......... | H04L 63/0428 |
| EP | 3989675 A1 * | 4/2022 | ............ | H04W 28/02 |
| KR | 20200085651 A * | 7/2020 | | |

* cited by examiner

*Primary Examiner* — Philip C Lee
(74) *Attorney, Agent, or Firm* — NSIP Law

(57) ABSTRACT

The present disclosure relates to an IP based vehicle network technology. In a method of providing a support for IPv6 networks operating over vehicle-to-everything (V2X) communications, a user equipment (UE) that is mounted on a vehicle to operate based on V2X services communicates with another vehicle through vehicle-to-vehicle (V2V) communication links, generates an available IPv6 address based on a result of communication, and configures an IPv6 address for a multi-hop V2X network when the vehicle moves.

15 Claims, 5 Drawing Sheets

APPARATUS AND METHOD FOR PROVIDING BASIC SUPPORT FOR IPV6 NETWORKS OPERATING OVER 5G VEHICLE-TO-EVERYTHING COMMUNICATIONS

CROSS-REFERENCE TO RELATED APPLICATIONS

This application claims the benefit under 35 U.S.C. § 119(a) of Korean Patent Application No. 10-2022-0137822 filed on Oct. 24, 2022, in the Korean Intellectual Property Office, the entire disclosure of which is incorporated herein by reference for all purposes.

TECHNICAL FIELD

The present disclosure relates to an IP based vehicle network technology, and more particularly to an apparatus and method for providing a support for IPv6 networks operating over 5G vehicle-to-everything (V2X) communications, and a computer readable medium recording a program for executing the method on a computer.

BACKGROUND ART

The 3GPP has published the long-term evolution (LTE) V2X in its Release 14 to support V2X communications using the Uu and PC5 reference points for vehicle-to-infrastructure (V2I) and vehicle-to-vehicle (V2V), respectively. In the recent development, the 5G V2X has also been proposed to enhance the existing and future V2X use cases. Particularly, the 5G V2X improves the sidelink resource allocation and the handling of quality-of-service (QoS) in the current 5G networks, and beyond 5G (B5G) networks, such as 6G networks. It also extends the communication modes for UE over sidelink PC5 from broadcast mode to groupcast and unicast mode [TS24587].

Further, vehicular ad hoc networks (VANET) have been studied for intelligent transportation systems (ITS) such as such as driving safety, efficient driving, and entertainment.

The Internet operates based on the transmission control protocol/internet protocol (TCP/IP) published by the Internet engineering task force (IETF), and the TCP/IP may be found in request for comments (RFC) 703 and RFC 791 published by the IETF.

SUMMARY OF INVENTION

Technical Problem

The technical objective to be achieved by embodiments of the present disclosure is to overcome a weakness in that, for IPv6-based 5G V2X communications, it is not clear how the IPv6 addresses are configured for multi-hop 5G V2X networks, and to solve a problem in that, for a scenario having ground moving vehicles, how to determine the IPv6 router for stateless address autoconfiguration (SLAAC) is not clear.

The technical objectives to be achieved by the present disclosure are not limited to those that have been described hereinabove merely by way of example, and other technical objectives that are not mentioned can be clearly understood by those skilled in the art, to which the present disclosure pertains, from the following descriptions.

Technical Solution

To solve the above-described and other technical problems, in one aspect of the present disclosure, a method of providing a support for IPv6 networks operating over vehicle-to-everything (V2X) communications comprises a step in which a user equipment (UE) that is mounted on a vehicle to operate based on V2X services communicates with other vehicle through vehicle-to-vehicle (V2V) communication links; and a step in which the UE generates an available IPv6 address based on a result of communication, wherein the method further comprises a step in which, when the vehicle moves, the UE configures an IPv6 address for a multi-hop V2X network.

In the step of generating the available IPv6 address, in a unicast mode of IPv6-based 5G V2X, when an IPv6 stateless address autoconfiguration (SLAAC) process is used, the UE may generate the available IPv6 address using an IPv6 prefix received from another UE acting as a router.

When the IPv6 SLAAC process is used, one of UEs respectively mounted on a plurality of vehicles connected through the V2V communication links may be selected as an IPv6 router assigning an IPv6 address and prefix.

In the step of generating the available IPv6 address, in a unicast mode of IPv6-based 5G V2X, when an IPv6 link-local address is used, the UE may generate the available IPv6 address by locally forming a link-local address.

In the step of generating the available IPv6 address, in a broadcast or groupcast mode of IPv6-based 5G V2X, the UE may configure a link-local IPv6 address as a source IP address.

The step of configuring the IPv6 address for the multi-hop V2X network may comprise a step of registering an address of the UE; and a step in which the UE moving through the registered address establishes a link with a UE mounted on the other vehicle. The UE may perform an IPv6 SLAAC process of setting the IPv6 address with only a help of a router.

A dynamic IPv6 address given by the IPv6 SLAAC process may be used for forwarding a packet domain and a packet forwarding in a subnetwork.

An address of a UE with an IPv6 prefix belonging to the same subnetwork may be specified using the IPv6 SLAAC process.

An internetworking within a subnetwork may be performed through the router.

Furthermore, there is provided a computer readable medium recording a program for executing the method of providing the support for IPv6 networks on a computer.

To solve the above-described and other technical problems, in another aspect of the present disclosure, a device mounted on a vehicle to provide a support for IPv6 networks operating over vehicle-to-everything (V2X) communications comprises a transceiver configured to transmit and receive signals; a memory configured to store data; and a processor configured to functionally control the transceiver and the memory, wherein the processor is configured to communicate with other vehicle through vehicle-to-vehicle (V2V) communication links using the transceiver, generate an available IPv6 address based on a result of communication, and configure an IPv6 address for a multi-hop V2X network when the vehicle moves.

The processor may be further configured to, in a unicast mode of IPv6-based 5G V2X, when an IPv6 stateless address autoconfiguration (SLAAC) process is used, generate the available IPv6 address using an IPv6 prefix received from another user equipment (UE) acting as a router.

When the IPv6 SLAAC process is used, one of UEs respectively mounted on a plurality of vehicles connected through the V2V communication links may be selected as an IPv6 router assigning an IPv6 address and prefix.

The processor may be further configured to, in a unicast mode of IPv6-based 5G V2X, when an IPv6 link-local address is used, generate the available IPv6 address by locally forming a link-local address.

The processor may be further configured to, in a broadcast or groupcast mode of IPv6-based 5G V2X, configure a link-local IPv6 address as a source IP address.

The processor may be further configured to register an address of the UE and configure the IPv6 address for the multi-hop V2X network as the UE moving through the registered address establishes a link with a UE mounted on the other vehicle and performs an IPv6 SLAAC process of setting the IPv6 address with only a help of a router.

A dynamic IPv6 address given by the IPv6 SLAAC process may be used for forwarding a packet domain and a packet forwarding in a subnetwork.

An address of a UE with an IPv6 prefix belonging to the same subnetwork may be specified using the IPv6 SLAAC process.

An internetworking within a subnetwork may be performed through the router.

Effects of the Invention

Embodiments of the present disclosure provide a baseline for using IPv6 in hosts communicating with each other by the 5th generation (5G) new radio (NR) V2X links defined by the 3GPP, and suggest the extension over 5G V2X links to enable the SLAAC process for a multi-hop communication scenario. Hence, they can enhance and broaden the connectivity in a vehicular environment by utilizing the specifications developed by the 3GPP.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

BRIEF DESCRIPTION OF THE DRAWINGS

The accompanying drawings, which are included to provide a further understanding of the present disclosure and constitute a part of the detailed description, illustrate embodiments of the present disclosure and serve to explain technical features of the present disclosure together with the description.

DETAILED DESCRIPTION

Figure 1:
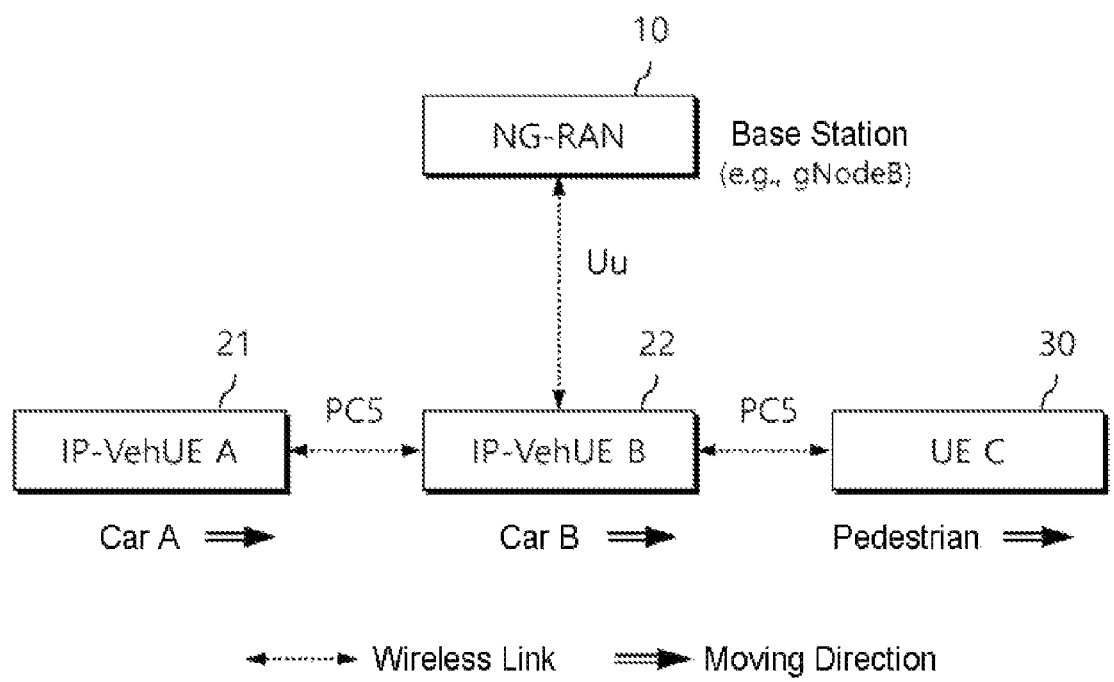
FIG. 1 illustrates 3GPP 5G V2X architecture in which embodiments of the present disclosure are implemented.

Reference will now be made in detail to embodiments of the disclosure, examples of which are illustrated in the accompanying drawings. Detailed descriptions of known arts will be omitted if such may mislead the gist of the present disclosure. In addition, throughout the present disclosure, "comprising" a certain component means that other components may be further comprised, not that other components are excluded, unless otherwise stated.

Terms used in the present disclosure are only used to describe specific embodiments, and are not intended to limit the present disclosure. Expressions in the singular form include the meaning of the plural form unless they clearly mean otherwise in the context. In the present disclosure, expressions such as "comprise" or "have" are intended to mean that the described features, numbers, steps, operations, components, parts, or combinations thereof exist, and should not be understood to be intended to exclude in advance the presence or possibility of addition of one or more other features, numbers, steps, operations, components, parts, or combinations thereof.

Unless otherwise specified, all of the terms which are used herein, including the technical or scientific terms, have the same meanings as those that are generally understood by a person having ordinary skill in the art to which the present disclosure pertains. The terms defined in a generally used dictionary can be understood to have meanings identical to those used in the context of a related art, and are not to be construed to have ideal or excessively formal meanings unless they are obviously specified in the present disclosure.

The present disclosure provides a baseline for using IPv6 in hosts communicating with each other by the 5th generation (5G) new radio (NR) vehicle-to-everything (V2X) links defined by the 3rd generation partnership project (3GPP). The baseline defined in the present disclosure has the minimal changes to existing stacks. Moreover, the present disclosure identifies the limitations of such usage.

The motivation for the present disclosure is the service discovery that utilizes the specifications developed by 3GPP to enhance and broaden the connectivity in a vehicular environment. As the 5G core (5GC) and 5G new radio (5G-NR) with 5G user equipment (UE) are being deployed worldwide, they can be of great importance in creating a connected network for moving objects such as automobiles, motorcycles, drones etc.

However, for IPv6-based 5G V2X communications based on the 3GPP documents [TS23287] [TS24587], it is still not clear how the IPv6 addresses are well configured for multi-hop 5G V2X networks. Particularly, when the stateless address autoconfiguration (SLAAC) process is used in IPv6-based 5G V2X communications, a vehicle as an IPv6 router, which assigns an IPv6 prefix to another vehicle in SLAAC, shall be selected or determined. For a scenario having ground moving vehicles, how to determine the IPv6 router for SLAAC is still not clear. In addition, the 3GPP 5G V2X specifications discourage the use of the duplicate address detection (DAD) [RFC4862] [RFC7527] and neighbor discover (ND) messages [RFC4861], which arises the concern of unusable IPv6-based 5G V2X services in the future.

Thus, the present disclosure offers the basic support for IPv6-based 5G V2X communications to enable application services such as infotainment and cooperative driving safety through the driving context information sharing.

The present disclosure uses terminology described in [RFC8691]. In addition, the following terminology is defined below.

Internet Protocol Vehicle User Equipment (IP-VehUE)

The IP-VehUE is a UE device mounted on a vehicle such as car, motorcycle, and scooter that operates based on 5G V2X services to transmit IPv6 data packets. The IP-VehUE can connect to the vehicle's internal networks.

Next Generation Radio Access Network (NG-RAN) Node

The NG-RAN node is a base station node that provides user plane and control plane functions toward IP-VehUEs, and also connects to 5GC networks. The NG-RAN node can be a gNodeB (gNB) in 5G or an ng-eNobdB (ng-eNB) in E-UTRA per the 5G network definition [TS23501] [TS38300].

5G New Radio PC5 Reference Point (5G NR-PC5 RP)

The 5G NR-PC5 RP is referred to as communication links among IP-VehUEs (i.e., V2V).

5G New Radio Uu Reference Point (5G NR-Uu RP)

The 5G NR-Uu RP is referred to as communication links between an IP-VehUE and an NG-RAN node.

FIG. 1 illustrates 3GPP 5G V2X architecture in which embodiments of the present disclosure are implemented. A high-level system architecture for V2X communication over PC5 and Uu reference points (RPs) is illustrated in FIG. 1. A modified sidelink interface may allow IP-VehUEs 21 and 22 to communicate with each other by the PC5 RP. The IP-VehUEs 21 and 22 can connect with a stationary NG-RAN through Uu interface.

Figure 2:
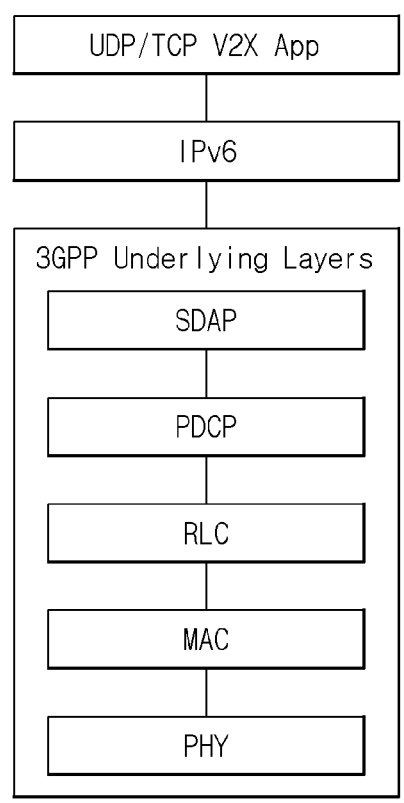
FIG. 2 illustrates 3GPP IPv6-based 5G V2X communications protocol stack in which embodiments of the present disclosure are implemented.

Both communications among the IP-VehUEs and between the IP-VehUEs and NG-RAN mainly rely on the lower layers illustrated in FIG. 2. FIG. 2 illustrates 3GPP IPv6-based 5G V2X communications protocol stack in which embodiments of the present disclosure are implemented.

The 5G V2X communications support both IP and non-IP based message exchanges in unicast, broadcast, and groupcast modes per 3GPP documents [TS23287] [TS24587]. For the IPv6-based 5G V2X communications via PC5 RP, only IPv6 is used for the communications. In the unicast mode of IPv6-based 5G V2X by PC5 RP, an IP-VehUE uses either the IPv6 Stateless Address Autoconfiguration (SLAAC) process or the IPv6 link-local addresses to generate usable IP addresses [RFC4862].

When using SLAAC, an IP-VehUE uses an IPv6 prefix sent by another IP-VehUE acting as an IPv6 default router.

When using IPv6 link-local addresses, an IP-VehUE forms the link-local addresses locally without duplicate address detection (DAD) [TS23287].

In the broadcast and groupcast modes of 5G V2X over PC5 RP, an IP-VehUE configures a link-local IPv6 address as the source IP address. The configuration of the link-local IPv6 address does not send neighbor solicitation (NS) and neighbor advertisement (NA) messages for DAD per the 3GPP document [TS23287].

Maximum Transmission Unit (MTU)

The V2X standard based on the 5G NR air interface introduced advanced functionalities to support connected and automated driving. The default MTU for IP packets on 5G V2X links over both PC5 and Uu RPs is inherited from [RFC2464], which is 1500 octets. Also as defined in [RFC8200], the 5G V2X links must offer a minimum MTU of 1280 octets to the IP layer, and IP packets on those links must follow other IPv6 recommendations, especially with regard to fragmentation.

Frame Format

As illustrated in FIG. 2, the IP packets over 5G V2X links follow the general frame format according to the protocol stack defined by 3GPP.

Link-Local Addresses

The IPv6-based 5G V2X communications use link-local addresses for IP packets. IPv6 addresses are assigned enabling the establishment of communication in and out of the subnet. To avoid conflicts between link local addresses in wireless vehicle networks, the interface identifier used by each IP-VehUE is ensured to be unique through addressing. There are several types of IPv6 addresses [RFC4291] [RFC4193] that may be assigned to a 5G V2X interface.

Stateless Address Autoconfiguration (SLAAC)

The following suggests the extension over 5G V2X links to enable an SLAAC process for a multi-hop communication scenario.

Figure 3:
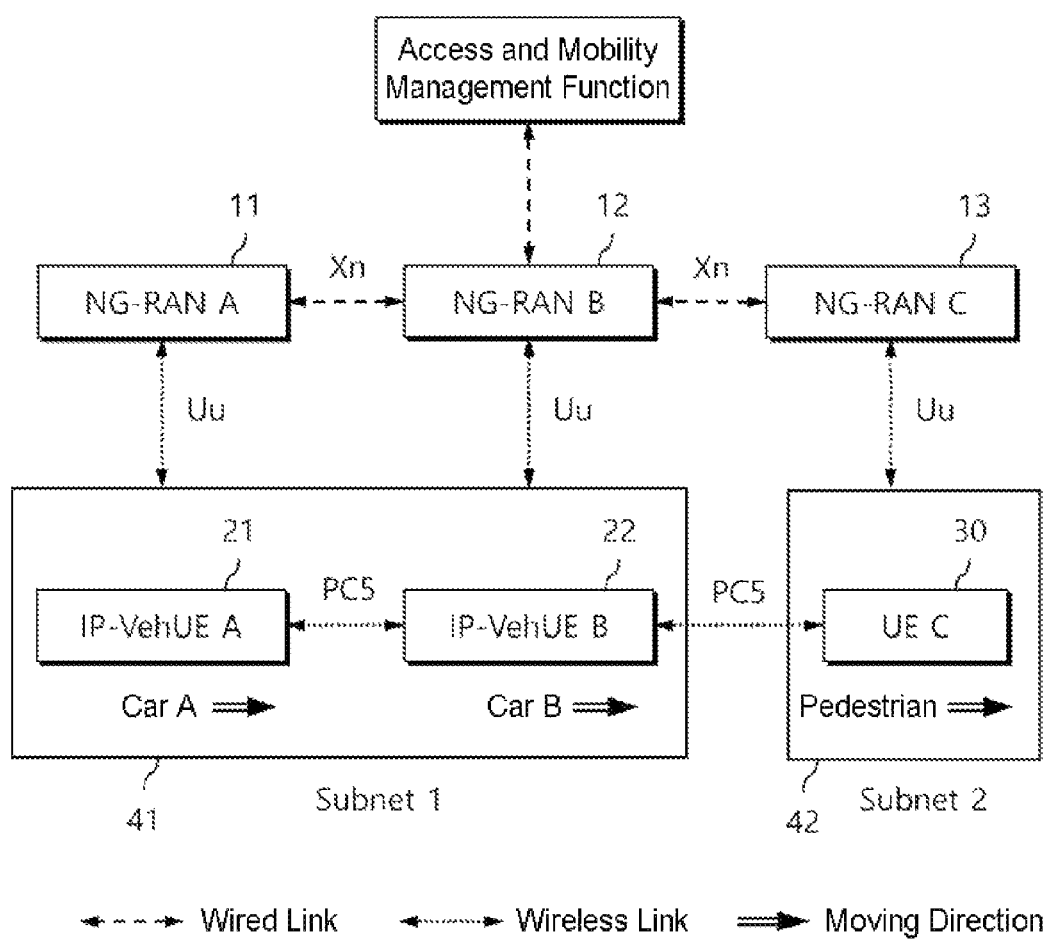
FIG. 3 illustrates 3GPP 5G V2X network architecture in which embodiments of the present disclosure are implemented.

FIG. 3 illustrates 3GPP 5G V2X network architecture in which embodiments of the present disclosure are implemented.

In the illustrated vehicular network, there are two subnets called a subnet 1 (41) and a subnet 2 (42). The subnet 1 (41) is a multi-link subnet consisting of a plurality of wireless coverage areas, and these areas may share the same IPv6 prefix to construct a single logical subnet [RFC9365]. That is, wireless links of NG-RAN A (11) and NG-RAN B (12) belong to the same subnet of the subnet 1 (41). Thus, since IP-VehUE A (21) and IP-VehUE B (22) use the same prefix for the subnet 1 (41) and are within the wireless communication range, they can directly communicate with each other. In a multi-link subnet, a vehicle (e.g., car A and car B in FIG. 3) may configure its global IPv6 address through an address registration procedure including a multi-hop duplicate address detection (DAD) specified in vehicular neighbor discovery (VND). On the other hand, the subnet 2 (42) uses a prefix different from the prefix of the subnet 1 (41). A pedestrian residing in the subnet 2 (42) cannot directly talk to the cars A and B because they belong to different subnets. The vehicles can construct connected vehicular ad hoc networks (VANET), so they can communicate with each other without the relaying, but the forwarding over the VANET is possible.

To enable a reachability of moving nodes across different subnets, an address registration is defined [RFC4862]. Links among moving IP-VehUEs (i.e., electric scooters, unmanned aerial vehicles, and connected cars) through optimized address registration and a multi-hop DAD mechanism need to be conducted.

A dynamic IPv6 address given by the SLAAC is used for forwarding the packet domain and packet forwarding in a subnetwork. The high mobility features in a 5G-NR vehicular network requires a persistent connection to ensure communication. In the highway scenario, vehicular ad hoc networks (VANET) where IP-VehUEs wirelessly interconnect improve communication efficiency. The details of neighbor discovery are addressed in [I-D.jeong-ipwave-vehicular-neighbor-discovery], and the mobility management handling strategies are address in [I-D.jeong-ipwave-vehicular-mobility-management] as well.

For 5G V2V by PC5 in the unicast mode, one vehicle UE (VehUE) needs to be an IPv6 router for IPv6 Stateless Address Autoconfiguration (SLAAC) [RFC4862]. The 5G V2X specifications [TS23287] [TS24587] do not specify which VehUE shall be the IPv6 router for SLAAC. Also, it does not specify how many IPv6 addresses/prefixes a VehUE will have in this case. If vehicles consist of VANET and are not connected to NG-RAN, a vehicle VehUE that has already performed IPv6 address configuration via NG-RAN through vehicular neighbor discovery (VND) [I-D.jeong-ipwave-vehicular-neighbor-discovery] may share its IPv6 prefix with other vehicles, and allow the other vehicles to perform IPv6 SLAAC and to temporarily use the IPv6. If these vehicles are connected to the NG-RAN in the future, they can formally register their IPv6 addresses through the VND.

Figure 4:
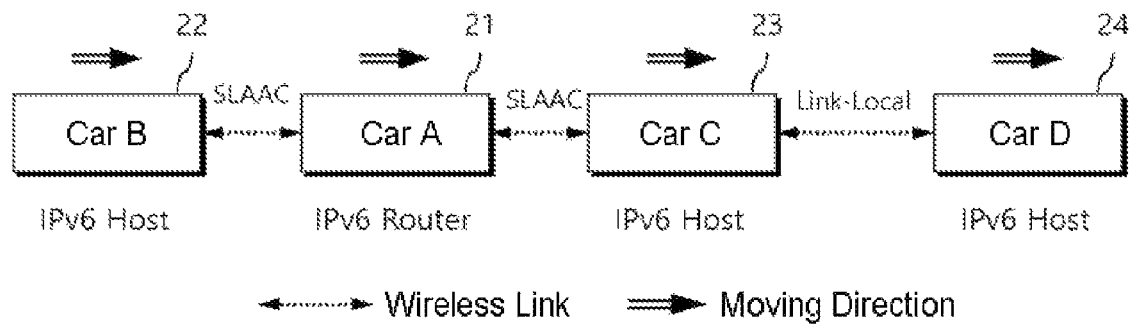
FIG. 4 illustrates SLAAC process in a unicast mode by PC5 interface of 5G V2V.

FIG. 4 illustrates SLAAC process in a unicast mode by PC5 interface of 5G V2V.

As illustrated in FIG. 4, a VehUE (e.g., car A (21)) among VehUEs 21, 22, 23 and 24 shall be acting as an IPv6 router using SLAAC to assign IPv6 addresses/prefixes for other VehUEs. In this case, there are several issues to solve for IPv6 ND over 5G V2X as follows:

- Which VehUE shall be the IPv6 router for the role to assign IPv6 addresses/prefixes if multiple VehUEs can be or want to be an IPv6 router? In such a case, as a method of selecting the IPv6 router, it may randomly select a vehicle as the IPv6 router or select a vehicle with a small binary value of the 128-bit IPv6 address as the IPv6 router.
- For a VehUE acting as an IPv6 router, how many IPv6 addresses/prefixes will it assign? If IPv6 addresses recently configured through NG-RAN are valid, the VehUE acting as the IPv6 router may use IPv6 prefix for the IPv6 addresses as IPv6 prefix for a subnet when the VehUE has acted as the IPv6 router.
- How much will the role of an IPv6 router burden the IPv6 router VehUE? Since the VehUE may consume a lot of energy by forwarding packets of other vehicles while operating as the IPv6 router, if the other vehicles act as the IPv6 router after a predetermined time (e.g., five minutes) has passed, the VehUE and the other vehicles can alternately perform the role of the IPv6 router. In this instance, the vehicle acting as the IPv6 router can be selected as a vehicle, that is geographically close to the center of the VANET, to improve communication coverage.
- For a VehUE receiving IPv6 addresses/prefixes from an IPv6 router VehUE, how many IPv6 addresses/prefixes will it have on the movement? The number of IPv6 addresses/prefixes (e.g., one or two) is determined based on a local policy. Since one IPv6 address is sufficient for communication between the vehicles within the VANET, one can be selected as a default.
- If a VehUE (e.g., car D (24) in FIG. 4) does not have any connection with an IPv6 router VehUE, it will only use an IPv6 link local address for communications. If the car D (24) is connected to the car C (23) over PC5 wireless communications and can perform multi-hop routing with the car A (21) performing the role of the router, the car D (24) can perform the SLAAC for its own IPv6 address registration by receiving the IPv6 prefix via the car C (23) from the car A (21). That is, the multi-hop routing is triggered so as to transmit IPv6 packet.

For V2V and V2I communications among VehUEs and gNodeB, the 5G specifications [TS23287] [TS24587] do not mention that VehUEs will use the same IPv6 configuration. It is necessary to consider whether the VehUEs will use the same prefix or the different prefixes for both V2V and V2I communications.

For multi-hop V2V and V2I among VehUEs and gNodeB, existing routing protocols are costly to maintain a routing table. The 5G specifications [TS23287] [TS24587] do not consider how to minimize control traffic overhead for both routing and IPv6 neighbor discovery (ND) [RFC4861].

Subnet Structure

The network structure stated in FIG. 3 follows the specifications defined in [I-D.jeong-ipwave-vehicular-neighbor-discovery]. Among the three NG-RANs (11, 12, and 13) deployed, two NG-RANs (11 and 12) are deployed in same the subnet 1 (41), and NG-RAN C (13) is deployed in a different subnet 2 (42). IP-VehUEs (21 and 22) establishes a connection in the coverage of an NG-RAN, and to enable a handover between two NG-RANs, a multi-link subnet is involved. The internetworking within subnetworks is done through IP router (i.e., NG-RAN). IP-VehUE addresses with IPv6 prefixes belonging to the same subnetwork are specified using SLAAC.

Figure 5:
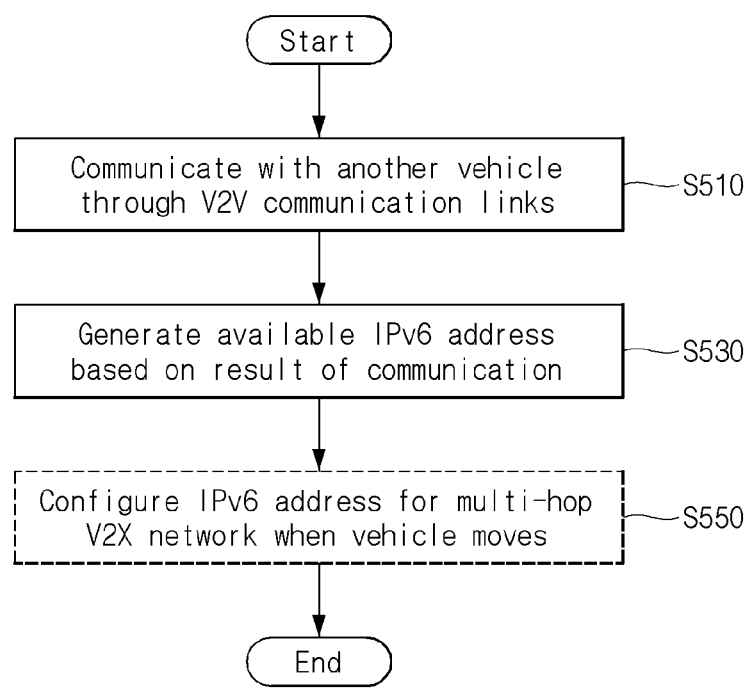
FIG. 5 is a flowchart illustrating a method of providing a support for IPv6 networks operating over vehicle-to-everything (V2X) communications according to an embodiment of the present disclosure.

FIG. 5 is a flowchart illustrating a method of providing a support for IPv6 networks operating over vehicle-to-everything (V2X) communications according to an embodiment of the present disclosure.

In step S510, a user equipment (UE) that is mounted on a vehicle to operate based on V2X services communicates with another vehicle through vehicle-to-vehicle (V2V) communication links.

In step S530, the UE generates an available IPv6 address based on a result of communication. As described above, the 5G V2X communications support both IP and non-IP based message exchanges in unicast, broadcast, and groupcast modes.

In the unicast mode of IPv6-based 5G V2X, when an IPv6 stateless address autoconfiguration (SLAAC) process is used, the UE can generate the available IPv6 address using IPv6 prefix received from another UE acting as a router. When the IPv6 SLAAC process is used, it is preferable that one of UEs respectively mounted on a plurality of vehicles connected through the V2V communication links is selected as an IPv6 router assigning IPv6 address and prefix.

In addition, in the step S530, in the unicast mode of IPv6-based 5G V2X, when an IPv6 link-local address is used, the UE can generate the available IPv6 address by forming a link-local address locally without duplicate address detection (DAD) [TS23287].

In the broadcast or groupcast mode of IPv6-based 5G V2X, the UE can configure a link-local IPv6 address as a source IP address. The configuration of the link-local IPv6 address does not send neighbor solicitation (NS) and neighbor advertisement (NA) messages for DAD.

In step S550, when the vehicle moves, the UE configures IPv6 address for multi-hop V2X network. More specifically, in this process, the UE may register an address of the UE, and the UE moving through the registered address may establish a link with a UE mounted on another vehicle and perform the IPv6 SLAAC process of setting the IPv6 address with only the help of the router.

Further, in the step S550, a dynamic IPv6 address given by the IPv6 SLAAC process may be used for forwarding a packet domain and packet forwarding in a subnetwork.

Further, in the step S550, the address of the UE with the IPv6 prefix belonging to the same subnetwork may be specified using the IPv6 SLAAC process.

In addition, in the step S550, the internetworking within the subnetwork may be done through the router.

Figure 6:
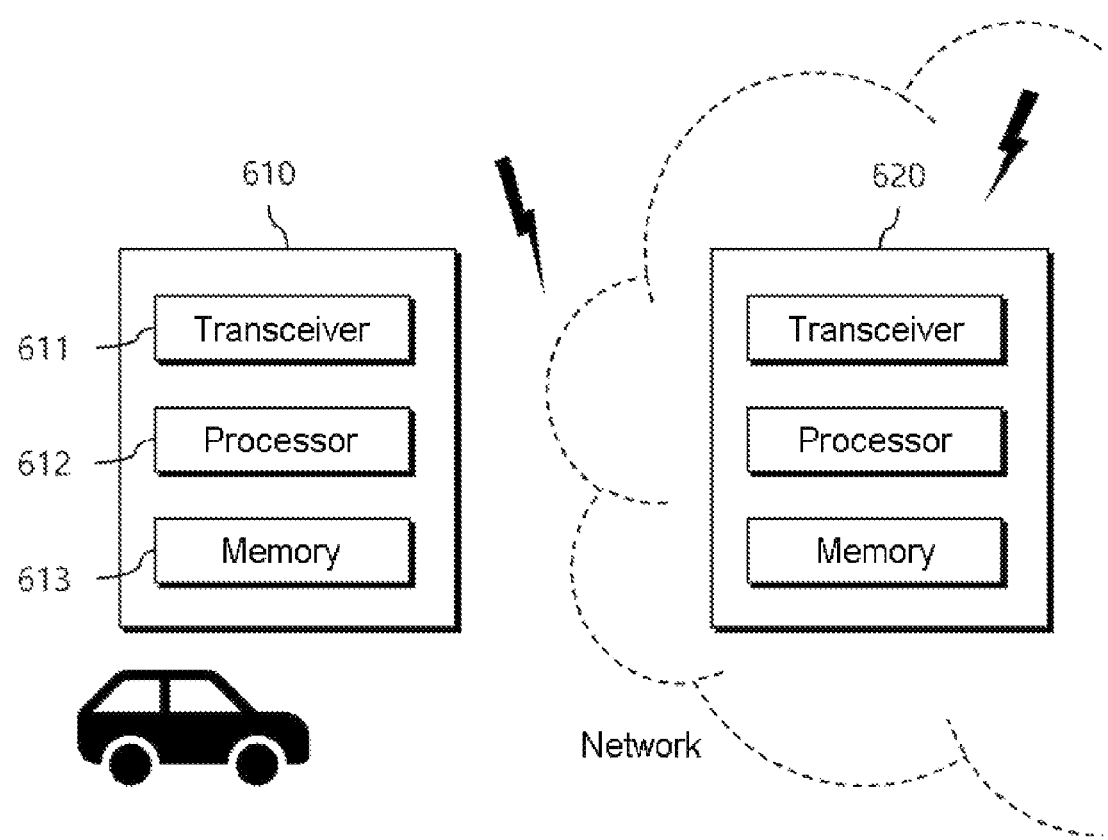
FIG. 6 is a block diagram illustrating a device providing a support for IPv6 networks operating over vehicle-to-everything (V2X) communications according to another embodiment of the present disclosure.

FIG. 6 is a block diagram illustrating a device providing a support for IPv6 networks operating over vehicle-to-everything (V2X) communications according to another embodiment of the present disclosure. FIG. 6 illustrates reconfiguration of each step illustrated in FIG. 5 in terms of hardware configuration of the IP-VehUE or the UE. Therefore, in the present disclosure, only the operation or function of each component will be briefly described to avoid duplication of explanation.

Devices 610 and 620 that are mounted on vehicles to provide a support for IPv6 networks operating over vehicle-to-everything (V2X) communications may be the IP-VehUE or the UE, but it is preferable that the device in the present disclosure is implemented as a device mounted on a vehicle in that technical features are proposed based on the premise of movement. The devices 610 and 620 may be implemented as a UE and a UE or a UE and a server, if necessary or desired. Hereinafter, the components will be described based on one UE device 610 on which embodiments of the present disclosure are focused.

A transceiver 611 is configured to transmit and receive signals.

A memory 613 is configured to store data.

A processor 612 is configured to functionally control the transceiver 611 and the memory 613. The processor 612 communicates with other vehicle through vehicle-to-vehicle (V2V) communication links using the transceiver 611, generates an available IPv6 address based on a result of communication, and configures IPv6 address for multi-hop V2X network when the vehicle moves.

In a unicast mode of IPv6-based 5G V2X, when an IPv6 stateless address autoconfiguration (SLAAC) process is used, the processor 612 can generate the available IPv6 address using IPv6 prefix received from another UE acting as a router. In particular, when the IPv6 SLAAC process is used, it is preferable that one of UEs respectively mounted on a plurality of vehicles connected through the V2V communication links is selected as an IPv6 router assigning IPv6 address and prefix.

In the unicast mode of IPv6-based 5G V2X, when an IPv6 link-local address is used, the processor 612 can generate the available IPv6 address by locally forming a link-local address.

In a broadcast or groupcast mode of IPv6-based 5G V2X, the processor 612 can configure a link-local IPv6 address as a source IP address.

The processor 612 may register an address of the UE, and configure IPv6 address for multi-hop V2X network as the UE moving through the registered address establishes a link with a UE mounted on the other vehicle and performs the IPv6 SLAAC process of setting the IPv6 address with only the help of the router.

A dynamic IPv6 address given by the IPv6 SLAAC process may be used for forwarding a packet domain and packet forwarding in a subnetwork.

Further, the address of the UE with the IPv6 prefix belonging to the same subnetwork may be specified using the IPv6 SLAAC process.

In addition, the internetworking within the subnetwork may be performed through the router.

As described above, the present disclosure provides methods and settings for using IPv6 to communicate among IPv6 nodes within the communication range of one another over 5G V2X (i.e., the 5th Generation Vehicle-to-Everything) links. Support for these methods and settings require minimal changes to the existing IPv6 protocol stack.

According to embodiments of the present disclosure, they have provided a baseline for using IPv6 in hosts communicating with each other by the 5th generation (5G) new radio (NR) V2X links defined by the 3GPP, and also suggested the extension over 5G V2X links to enable the SLAAC process for a multi-hop communication scenario. Hence, they can enhance and broaden the connectivity in a vehicular environment by utilizing the specifications developed by the 3GPP.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like. When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

Embodiments of the present disclosure can be implemented as computer-readable codes on a computer-readable recording medium. The computer-readable recording medium includes all types of recording devices in which data readable by a computer system is stored. Examples of the computer-readable recording medium include a ROM, a RAM, a CD-ROM, a magnetic tape, a floppy disk, an optical data storage device, etc. Further, the computer-readable recording medium may be distributed to computer systems connected over a network, and computer-readable codes may be stored and executed in a distributed manner. Functional programs, codes, and code segments for implementing embodiments of the present disclosure can be easily construed by programmers skilled in the art to which the present disclosure pertains.

Accordingly, in one or more non-transitory computer readable mediums storing one or more instructions, the one or more instructions executable by one or more processors are configured to allow a user equipment (UE), that is mounted on a vehicle to operate based on vehicle-to-everything (V2X) services, to process an operation of providing a support for IPv6 networks operating over V2X communications, and the UE communicates with other vehicle through vehicle-to-vehicle (V2V) communication links, generates an available IPv6 address based on a result of communication, and configures an IPv6 address for a multi-hop V2X network when the vehicle moves.

As described above, the present disclosure has been examined focusing on its various embodiments. A person with ordinary skills in the technical field to which the present disclosure pertains will be able to understand that the various embodiments can be implemented in modified forms within the scope of the essential characteristics of the present disclosure. Therefore, the disclosed embodiments are to be considered illustrative rather than restrictive. The scope of the present disclosure is shown in the claims rather than the foregoing description, and all differences within the scope should be construed as being included in the present disclosure.

DESCRIPTION OF SYMBOLS 10, 11, 12, 13: NG-RAN (Base Station)
21, 22, 23, 24: IP-VehUE (Vehicle)
30: UE (Pedestrian)
610, 620: IP-VehUE, UE
611: Transceiver
612: Processor
613: Memory

The invention claimed is:

1. A method of providing a support for IPV6 networks operating over vehicle-to-everything (V2X) communications, the method comprising:
a step in which a user equipment (UE) that is mounted on a vehicle to operate based on V2X services communicates with other vehicle through vehicle-to-vehicle (V2V) communication links; and a step in which the UE generates an IPV6 address based on a result of communication, wherein the method further comprises a step in which, when the vehicle moves, the UE configures the IPV6 address for a multi-hop V2X network, wherein in the step of generating the IPV6 address;

in a unicast mode of IPV6-based 5G V2X, when an IPV6 stateless address autoconfiguration (SLAAC) process is used, the UE generates the IPV6 address using an IPV6 prefix received from another UE which is a router, and in a broadcast or groupcast mode of IPV6-based 5G V2X, the UE configures a link-local IPv6 address as a source IP address.

2. The method of claim 1, wherein when the IPV6 SLAAC process is used, each of UEs which is respectively mounted on each of a plurality of vehicles connected through the V2V communication links is selected as an IPV6 router assigning an IPV6 address and prefix.

3. The method of claim 1, wherein in the step of generating the available IPv6 address, in a unicast mode of IPV6-based 5G V2X, when the IPv6 link-local address is used, the UE generates the IPv6 address by locally forming a link-local address.

4. The method of claim 1, wherein the step of configuring the IPv6 address for the multi-hop V2X network comprises:

a step of registering the IPV6 address of the UE; and a step in which the UE moving with the registered address establishes the V2V communication link with a UE mounted on the other vehicle, wherein the UB performs the IPV6 SLAAC process of setting the IPV6 address by the router.

5. The method of claim 4, wherein a dynamic IPv6 address given by the IPV6 SLAAC process is used for forwarding a packet domain and a packet forwarding in a subnetwork.

6. The method of claim 4, wherein the IPV6 address of the UE with an IPV6 prefix belonging to same subnetwork is specified using the IPV6 SLAAC process.

7. The method of claim 4, wherein an internetworking within a subnetwork is performed through the router.

8. One or more non-transitory computer readable mediums storing one or more instructions, wherein the one or more instructions executable by one or more processors are configured to allow a user equipment (UE), that is mounted on a vehicle to operate based on vehicle-to-everything (V2X) services, to process an operation of providing a support for IPV6 networks operating over V2X communications, wherein the UE communicates with other vehicle through vehicle-to-vehicle (V2V) communication links, wherein the UE generates an IPv6 address based on a result of communication, wherein when the vehicle moves, the UE configures the IPV6 address for a multi-hop V2X network, wherein in a unicast mode of IPv6-based 5G V2X, when an IPV6 stateless address autoconfiguration (SLAAC) process is used, the UE generates the IPV6 address using an IPV6 prefix received from another UE which is a router, and wherein in a broadcast or groupcast mode of IPV6-based 5G V2X, the UE configures a link-local IPv6 address as a source IP address.

9. A device mounted on a vehicle to provide a support for IPV6 networks operating over vehicle-to-everything (V2X) communications, the device comprising:

a transceiver configured to transmit and receive signals;

a memory configured to store data; and a processor configured to functionally control the transceiver and the memory, wherein the processor is configured to:

communicate with other vehicle through vehicle-to-vehicle (V2V) communication links using the transceiver;

generate an IPV6 address based on a result of communication; and when the vehicle moves, configure the IPV6 address for a multi-hop V2X network, wherein the processor is further configured to:

in a unicast mode of IPv6-based 5G V2X, when an IPV6 stateless address autoconfiguration (SLAAC) process is used, generate the IPv6 address using an IPV6 prefix received from another UE which is a router, and in a broadcast or groupcast mode of IPV6-based 5G V2X, the UE configures a link-local IPv6 address as a source IP address.

10. The device of claim 9, wherein when the IPV6 SLAAC process is used, each of UEs which is respectively mounted on each of a plurality of vehicles connected through the V2V communication links is selected as an IPV6 router assigning an IPv6 address and prefix.

11. The device of claim 9, wherein the processor is further configured to, in a unicast mode of IPV6-based 5G V2X, when the IPv6 link-local address is used, generate the IPv6 address by locally forming a link-local address.

12. The device of claim 9, wherein the processor is further configured to:

register the IPv6 address of the UE;

configure the IPv6 address for the multi-hop V2X network as the UE moving with the registered address establishes the V2V communication link with a UE mounted on the other vehicle and performs the IPV6 SLAAC process of setting the IPV6 address by the router.

13. The device of claim 12, wherein a dynamic IPv6 address given by the IPV6 SLAAC process is used for forwarding a packet domain and a packet forwarding in a subnetwork.

14. The device of claim 12, wherein the IPV6 address of the UE with an IPV6 prefix belonging to same subnetwork is specified using the IPV6 SLAAC process.

15. The device of claim 12, wherein an internetworking within a subnetwork is performed through the router.

* * * * *